(12) United States Patent
Yanaka et al.

(10) Patent No.: US 11,814,107 B2
(45) Date of Patent: Nov. 14, 2023

(54) VEHICLE

(71) Applicant: TOYOTA JIDOSHA KABUSHIKI KAISHA, Toyota (JP)

(72) Inventors: Akihiro Yanaka, Nagoya (JP); Shinji Kurachi, Kariya (JP); Hidenori Iwayama, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 17/498,068

(22) Filed: Oct. 11, 2021

(65) Prior Publication Data

US 2022/0161861 A1 May 26, 2022

(30) Foreign Application Priority Data

Nov. 24, 2020 (JP) ................................. 2020-194172

(51) Int. Cl.
B62D 25/08 (2006.01)
(52) U.S. Cl.
CPC ......... B62D 25/081 (2013.01); B62D 25/088 (2013.01)
(58) Field of Classification Search
CPC .............. B60R 21/34; B60R 2021/343; B60R 2021/0004; B62D 25/105; B62D 25/081; B62D 25/12; B62D 21/15
USPC .................. 296/187.04, 187.09, 192, 193.11; 180/69.2, 69.21
See application file for complete search history.

(56) References Cited

U.S. PATENT DOCUMENTS

| 6,565,148 | B1 | 5/2003 | Teramoto et al. | |
| 7,575,273 | B2* | 8/2009 | Wallman | B60R 21/38 |
| | | | | 296/193.11 |
| 2015/0035318 | A1* | 2/2015 | Serizawa | B62D 25/081 |
| | | | | 296/192 |
| 2016/0083019 | A1* | 3/2016 | Takada | B62D 25/12 |
| | | | | 296/193.11 |
| 2017/0050597 | A1* | 2/2017 | Hammer | B60R 19/34 |
| 2019/0106078 | A1* | 4/2019 | Nakamura | B62D 29/005 |
| 2020/0238946 | A1* | 7/2020 | Hammer | B60R 21/34 |

FOREIGN PATENT DOCUMENTS

| DE | 102008021099 | A1 | * | 10/2009 | | B60J 10/80 |
| FR | 2963592 | A1 | * | 2/2012 | | B60R 21/34 |
| JP | 2001-146177 | A | | 5/2001 | | |
| JP | 2008030632 | A | * | 2/2008 | | |
| JP | 2009-166603 | A | | 7/2009 | | |
| JP | 2019-069739 | A | | 5/2019 | | |
| JP | 2019-177814 | A | | 10/2019 | | |
| KR | 20020039764 | A | * | 5/2002 | | |
| KR | 20110023348 | A | * | 3/2011 | | |
| WO | WO-2015056778 | A1 | * | 4/2015 | | B60R 21/34 |

OTHER PUBLICATIONS

WO-2015056778-A1 machine translation (Year: 2015).*

* cited by examiner

*Primary Examiner* — Amy R Weisberg
*Assistant Examiner* — Kevin P Weldon
(74) *Attorney, Agent, or Firm* — Dinsmore & Shohl LLP

(57) ABSTRACT

A vehicle includes: a hood; a cowl top placed rearward of the hood; a body structure disposed below the hood and the cowl top; and a shock absorber that is disposed between the hood and the body structure and is fixed to the body structure. At least one of the hood and the cowl top has a support portion facing a side surface of the shock absorber.

8 Claims, 4 Drawing Sheets

VEHICLE

CROSS-REFERENCE TO RELATED APPLICATION

This application claims priority to Japanese Patent Application No. 2020-194172 filed on Nov. 24, 2020, incorporated herein by reference in its entirety.

BACKGROUND

1. Technical Field

The technique disclosed in the present specification relates to a vehicle having a shock absorber between a hood and a body structure.

2. Description of Related Art

Japanese Unexamined Patent Application Publication No. 2009-166603 (JP 2009-166603 A) discloses a vehicle having a shock absorber between a hood and a body structure. In this type of vehicle, when an object collides with the hood, the hood is deformed. The hood then comes into contact with the shock absorber, and the shock absorber is compressed to absorb the shock. This alleviates the shock applied to the object.

SUMMARY

When the hood comes into contact with the shock absorber, there may be a case where the shock absorber falls over and the shock absorber is not sufficiently compressed. In this case, the shock absorber cannot sufficiently absorb the shock. The present specification proposes a technique for suppressing falling of the shock absorber and absorbing the shock more reliably with the shock absorber.

A vehicle disclosed in the present specification includes: a hood; a cowl top placed rearward of the hood; a body structure disposed below the hood and the cowl top; and a shock absorber that is disposed between the hood and the body structure and is fixed to the body structure. At least one of the hood and the cowl top has a support portion facing a side surface of the shock absorber.

With this configuration, when the shock absorber is about to fall toward the support portion due to a collision, the support portion comes into contact with the side surface of the shock absorber. Therefore, it is possible to suppress the shock absorber from falling further toward the support portion. Accordingly, the shock absorber is easily compressed, and a shock is easily absorbed by the shock absorber.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an example vehicle disclosed in the present specification, the hood may have the support portion and the support portion may face a front side surface of the shock absorber.

In another example vehicle disclosed in the present specification, the cowl top may have the support portion and the support portion may face a rear side surface of the shock absorber.

In another example vehicle disclosed in the present specification, the hood and the cowl top may each have the support portion. The support portion of the hood may face the front side surface of the shock absorber, and the support portion of the cowl top may face the rear side surface of the shock absorber.

When the hood and the cowl top each have the support portion, a clearance between the support portion of the hood and the front side surface of the shock absorber may be larger than a clearance between the support portion of the cowl top and the rear side surface of the shock absorber.

With this configuration, when an object collides with the hood, the shock absorber is allowed to fall forward by a certain amount. When the shock absorber falls forward, it is possible to suppress the object colliding with the hood from moving rearward from the hood. Accordingly, it is possible to suppress an object that has collided with the hood from colliding with a member provided rearward of the shock absorber (for example, a wiper or a cleaning nozzle).

An example vehicle disclosed in the present specification may further have a protrusion disposed rearward of the shock absorber. Note that, the protrusion may be, for example, a rotating shaft of a wiper or a cleaning nozzle.

With this configuration, it is possible to suppress the object that has collided with the hood from colliding with the protrusion by the shock absorber.

Figure 1:
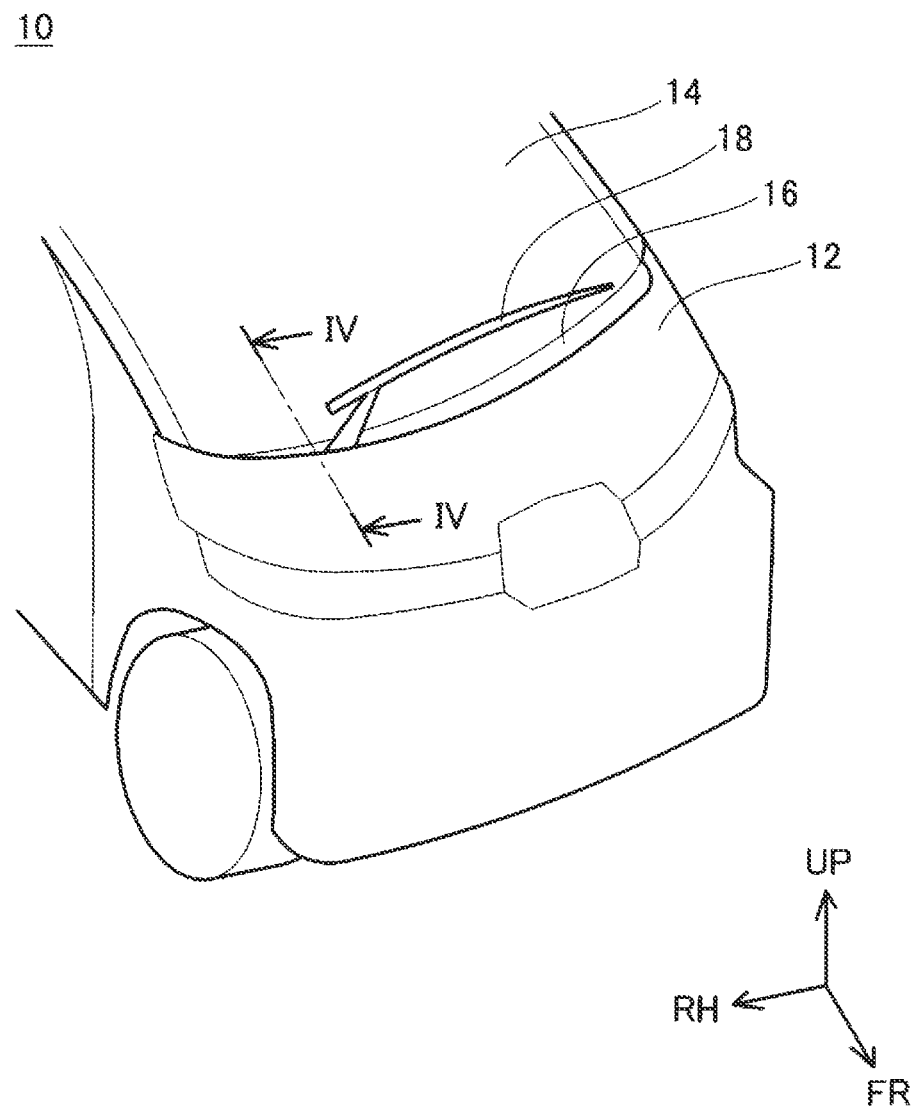
FIG. 1 is a perspective view of a vehicle 10.

A vehicle 10 according to an embodiment shown in FIG. 1 is an electric vehicle that travels using a driving force of a motor. In each diagram including FIG. 1, the arrow FR indicates the front side of the vehicle, the arrow RH indicates the right side of the vehicle, and the arrow UP indicates the upper side of the vehicle. The vehicle 10 includes a hood 12, a windshield 14, and a cowl top 16. The hood 12 covers an upper surface of the vehicle 10 in front of the windshield 14. A compartment that accommodates the motor and other components is provided below the hood 12. The hood 12 can be opened and closed. The cowl top 16 covers the area between the hood 12 and the windshield 14. A wiper 18 is installed on the cowl top 16.

Figure 2:
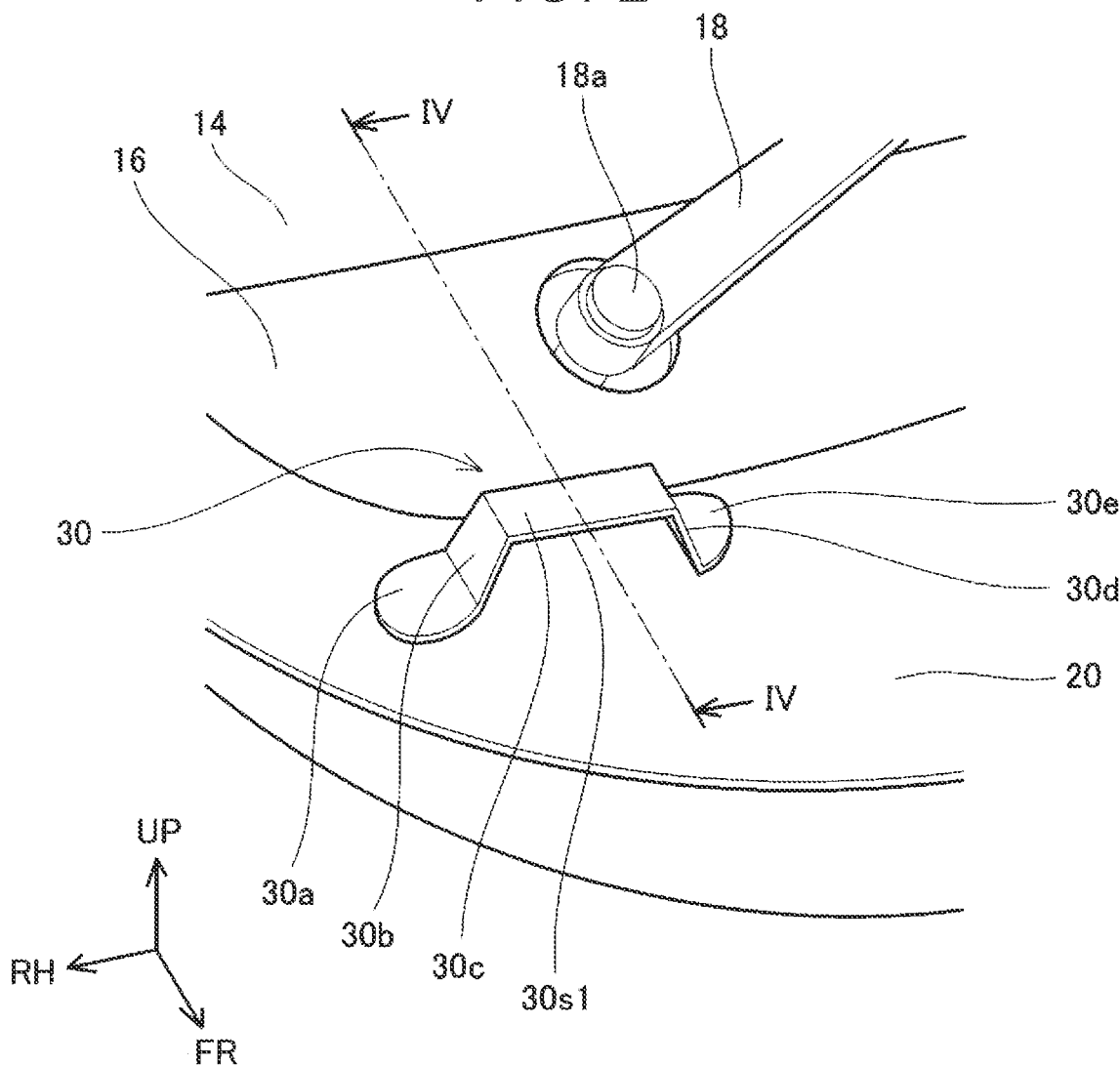
FIG. 2 is a perspective view showing a shock absorber 30 and its peripheral members.
Figure 3:
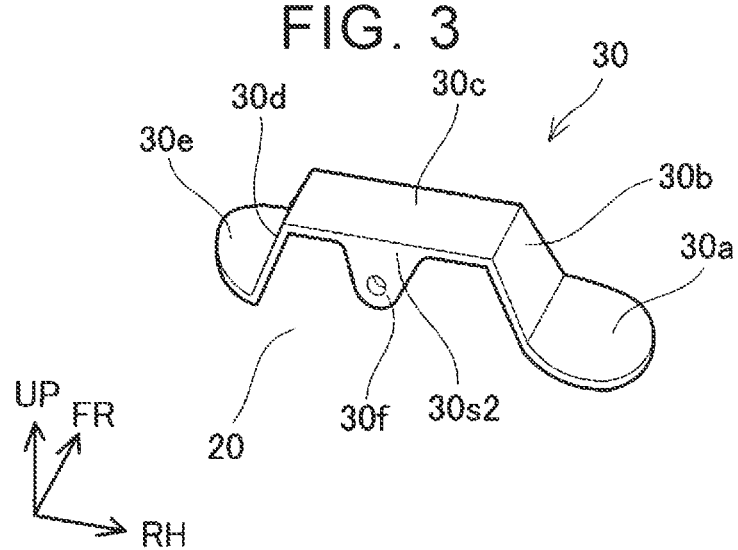
FIG. 3 is a perspective view of the shock absorber 30 as viewed from the rear.

FIG. 2 shows an enlarged view around the position of the IV-IV line shown in FIG. 1. FIG. 2 shows a state in which the hood 12 is removed. As shown in FIG. 2, a body structure 20 is disposed below the hood 12. Although not shown, the body structure 20 constitutes the compartment described above. A shock absorber 30 is fixed to the upper surface of the body structure 20. The shock absorber 30 is composed of a metal plate having a lower rigidity than those of the body structure 20 and the cowl top 16. End portions 30a, 30e on respective sides of the shock absorber 30 are fixed to the body structure 20 by welding or the like. The shock absorber 30 has standing portions 30b, 30d extending upward from the respective end portions 30a, 30e. The shock absorber 30 has a beam portion 30c connected to upper ends of the standing portions 30b, 30d. The beam portion 30c extends long in a right-left direction. A clearance is provided between the beam portion 30c and the body structure 20. FIG. 3 is a diagram of the shock absorber 30 as viewed from the rear side. As shown in FIG. 3, the shock absorber 30 has a guide portion 30f extending downward from a rear edge of the beam portion 30c. A clearance is provided between the guide portion 30f and the body structure 20. Further, as shown in FIGS. 2 and 3, the shock absorber 30 has a front side surface 30s1 and a rear side surface 30s2. The rear side surface 30s2 includes the surface of the guide portion 30f. As shown in FIG. 2, a rotating shaft 18a of the wiper 18 is disposed rearward of the shock absorber 30. The rotating shaft 18a is provided so as to project upward from the cowl top 16.

Figure 4:
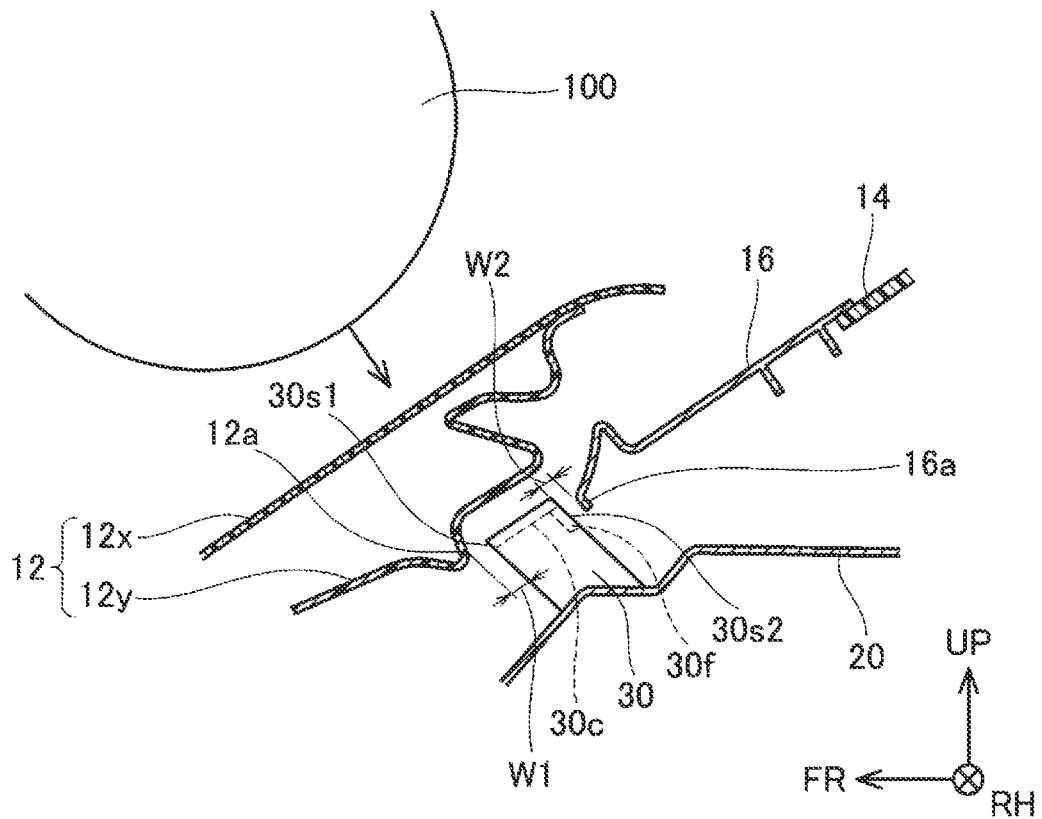
FIG. 4 is a sectional view taken along the line IV-IV shown in FIGS. 1 and 2.

FIG. 4 shows a section taken at the position of the line IV-IV shown in FIGS. 1 and 2. As shown in FIG. 4, the hood 12 is disposed above the body structure 20 and the shock absorber 30. Therefore, the shock absorber 30 is disposed between the hood 12 and the body structure 20. The hood 12 includes a hood outer panel 12x and a hood inner panel 12y. The hood outer panel 12x is a member having a plate shape, and constitutes a portion of the hood 12 that is exposed on the surface of the vehicle 10. The hood outer panel 12x is made of resin. The hood inner panel 12y is a member having a plate shape, and is fixed to an inner surface (that is, a lower surface) of the hood outer panel 12x. The hood inner panel 12y covers substantially the entire inner surface of the hood outer panel 12x. The hood inner panel 12y is made of resin. The hood inner panel 12y is complicatedly bent in the vicinity of the shock absorber 30. A support portion 12a facing the front side surface 30s1 of the shock absorber 30 (more specifically, a front side surface of the beam portion 30c) is configured by a part of the portion that is complicatedly bent.

The cowl top 16 is disposed above the body structure 20 rearward of the shock absorber 30. A clearance is provided between the cowl top 16 and the body structure 20. A rear edge of the cowl top 16 is fixed to a front edge of the windshield 14. The cowl top 16 extends so as to be displaced downward toward the front side. A front edge of the cowl top 16 constitutes a support portion 16a facing the rear side surface 30s2 of the shock absorber 30 (more specifically, a rear side surface of the guide portion 30f).

A clearance W1 is provided between the support portion 12a and the front side surface 30s1 of the shock absorber 30. A clearance W2 is provided between the support portion 16a and the rear side surface 30s2 of the shock absorber 30. The clearance W1 is larger than the clearance W2.

Figure 5:
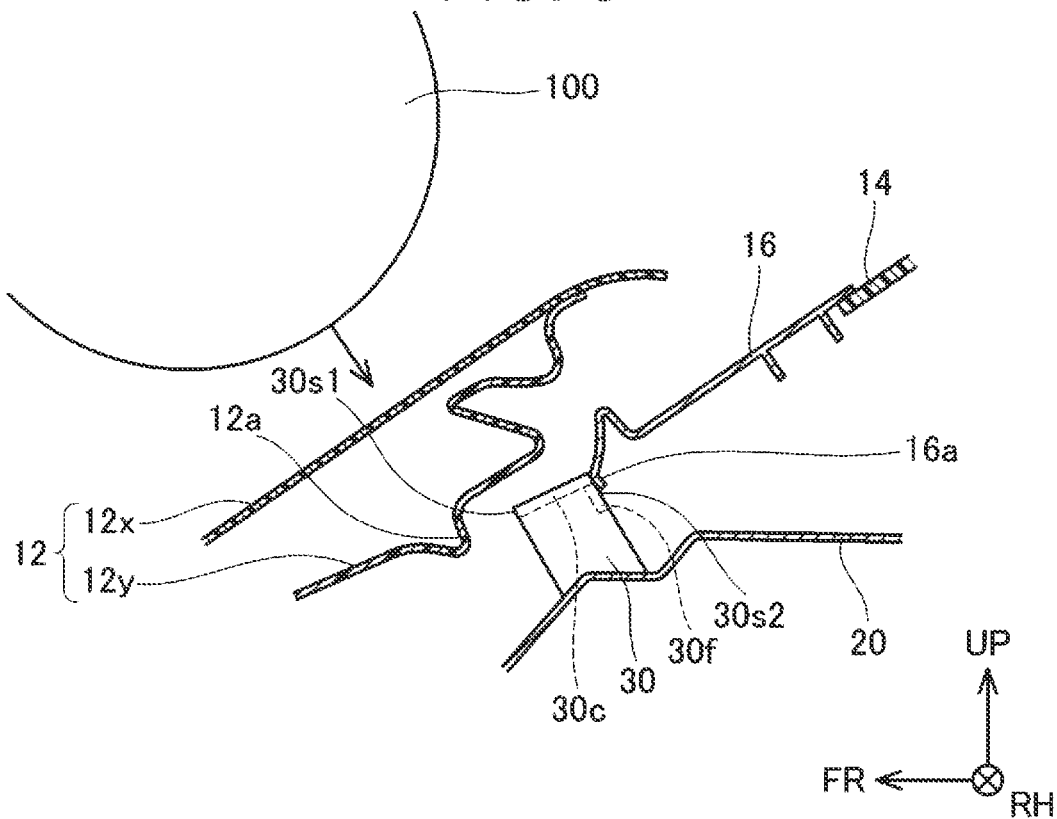
FIG. 5 is a sectional view taken along the line IV-IV shown in FIGS. 1 and 2.
Figure 6:
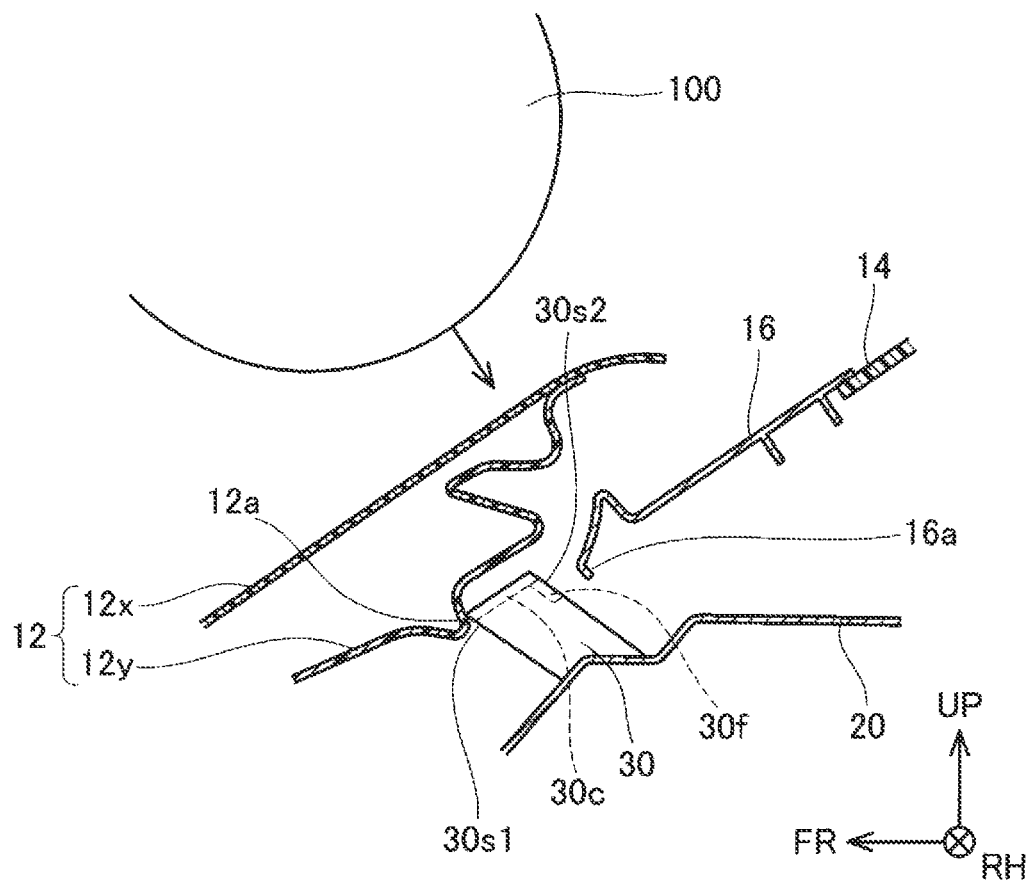
FIG. 6 is a sectional view taken along the line IV-IV shown in FIGS. 1 and 2.

When the vehicle 10 goes through a frontal collision, an object (for example, a pedestrian) may collide with the hood 12. An impactor 100 shown in FIGS. 4 to 6 is a test device that simulates collision of the object with the hood 12. The shock absorbing ability of the shock absorber 30 can be tested through collision of the impactor 100 with the hood 12. When the impactor 100 collides with the hood 12, the hood 12 (that is, the hood outer panel 12x and the hood inner panel 12y) is deformed, and the hood 12 collides with the shock absorber 30. With this configuration, the shock absorber 30 is deformed. When the shock absorber 30 is appropriately deformed, the shock absorber 30 can absorb the shock and alleviate the shock applied to the impactor 100.

Figure 7:
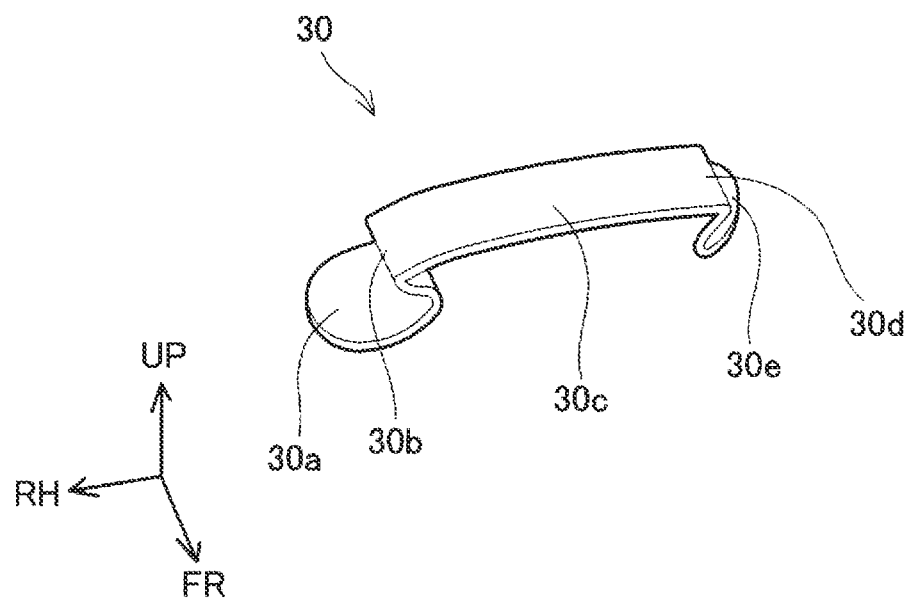
FIG. 7 is a perspective view of the shock absorber 30 that is a properly crushed.

FIG. 4 shows a case where the impactor 100 is moved straight toward the shock absorber 30 substantially directly above the shock absorber 30 such that the impactor 100 collides with the hood 12. In this case, as shown in FIG. 7, the standing portions 30b, 30d of the shock absorber 30 are bent, and the shock absorber 30 is crushed in a vertical direction. When the shock absorber 30 is compressed as described above, the shock absorber 30 can absorb a large amount of collision energy, and the shock applied to the impactor 100 can be alleviated.

FIG. 5 shows a case where the impactor 100 collides with the hood 12 slightly forward of the shock absorber 30. In this case, in the initial stage of the collision, a force is applied rearward from the hood 12 to the shock absorber 30, and the shock absorber 30 falls rearward. Then, as shown in FIG. 5, the rear side surface 30s2 of the shock absorber 30 comes into contact with the support portion 16a, and the shock absorber 30 is supported by the support portion 16a. Therefore, the shock absorber 30 is suppressed from falling further rearward. After the shock absorber 30 is supported by the support portion 16a, a force is therefore applied to the shock absorber 30 in the vertical direction. With this configuration, the shock absorber 30 is crushed in the vertical direction as shown in FIG. 7. Accordingly, a large amount of collision energy can be absorbed by the shock absorber 30, and the shock applied to the impactor 100 can be alleviated.

FIG. 6 shows a case where the impactor 100 collides with the hood 12 slightly rearward of the shock absorber 30. In this case, in the initial stage of the collision, a force is applied forward from the hood 12 to the shock absorber 30, and the shock absorber 30 falls forward. Then, as shown in FIG. 6, the front side surface 30s1 of the shock absorber 30 comes into contact with the support portion 12a, and the shock absorber 30 is supported by the support portion 12a. Therefore, the shock absorber 30 is suppressed from falling further forward. After the shock absorber 30 is supported by the support portion 12a, a force is therefore applied to the shock absorber 30 in the vertical direction. With this configuration, the shock absorber 30 is crushed in the vertical direction as shown in FIG. 7. Accordingly, a large amount of collision energy can be absorbed by the shock absorber 30, and the shock applied to the impactor 100 can be alleviated.

As described above, according to the vehicle 10 of the embodiment, even when the collision position of the impactor 100 is displaced forward or rearward with respect to the shock absorber 30, the shock absorber 30 can appropriately absorb the shock. Therefore, the shock applied to the impactor 100 can be appropriately alleviated. That is, with this configuration, when an object collides with the hood 12, the shock applied to the object can be appropriately alleviated.

Further, in the vehicle 10 of the embodiment, the clearance W1 between the support portion 12a and the front side surface 30s1 of the shock absorber 30 is larger than the clearance W2 between the support portion 16a and the rear side surface 30s2 of the shock absorber 30. Therefore, when the shock absorber 30 is inclined forward as shown in FIG. 6, the angle at which the shock absorber 30 is inclined becomes larger than when the shock absorber 30 is inclined rearward as shown in FIG. 5. When the shock absorber 30 is inclined forward as shown in FIG. 6, the impactor 100 is inclined due to the inclination of the shock absorber 30, and the impactor 100 is easily displaced forward. Forward displacement of the impactor 100 as described above makes it difficult for the impactor 100 to collide with the rotating shaft 18a of the wiper 18 disposed rearward of the shock absorber 30. As described above, in the vehicle 10 according to the embodiment, when the shock absorber 30 is inclined forward, an inclination angle is allowed to be larger than that when the shock absorber 30 is inclined rearward, whereby the impactor 100 is suppressed from colliding with the rotating shaft 18*a* provided rearward of the shock absorber 30. That is, when an object collides with the hood 12, it is possible to suppress the object from colliding with the rotating shaft 18*a* (that is, a protrusion).

Note that, in the above-described embodiment, the protrusion disposed rearward of the shock absorber 30 is the rotating shaft 18*a*. However, another protrusion (for example, a cleaning nozzle that sprays a cleaning liquid onto the windshield 14) may be disposed rearward of the shock absorber 30.

Note that, providing a support member for supporting the shock absorber 30 on the body structure 20 makes it possible to suppress the shock absorber 30 from falling. However, there are many other members on the body structure 20. Therefore, there may be a case where there is not a sufficient space for providing the support member on the body structure 20. Further, when the support member is provided on the body structure 20, deformation of the shock absorber 30 is hindered unless the support member is deformed together with the shock absorber 30. If the support member is made deformable, the support member may interfere with other members when the support member is deformed. As described above, there are many restrictions on providing the support member on the body structure 20. On the other hand, with the configuration of the vehicle 10 according to the embodiment, the support portions 12*a*, 16*a* can be provided on the hood 12 and the cowl top 16. Further, when the support portions 12*a*, 16*a* are provided on the hood 12 and the cowl top 16 as described above, the support portions 12*a*, 16*a* can support the upper portion of the shock absorber 30. That is, the shock absorber 30 can be supported at a higher position with respect to the end portions 30*a*, 30*e* that serve as fulcrums when the shock absorber 30 falls. Therefore, the support portions 12*a*, 16*a* can suppress falling of the shock absorber 30.

Although the embodiment has been described in detail above, the embodiment is merely an example and does not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or drawings achieve a plurality of objectives at the same time, and achieving one of the objectives itself has technical usefulness.

What is claimed is:

1. A vehicle, comprising:
a hood;
a cowl top placed rearward of the hood;
a body structure disposed below the hood and the cowl top; and
a shock absorber that is disposed between the hood and the body structure and includes a first end portion fixed to the body structure, a second end portion fixed to the body structure, a first standing portion extending upward from the first end portion, a second standing portion extending upward from the second end portion, and a beam portion connecting the first standing portion and the second standing portion, wherein at least one of the hood and the cowl top has a support portion facing a side surface of the beam portion of the shock absorber.

2. The vehicle according to claim 1, wherein:
the hood has the support portion; and
the support portion faces a front side surface of the beam portion of the shock absorber.

3. The vehicle according to claim 1, wherein:
the cowl top has the support portion; and
the support portion faces a rear side surface of the beam portion of the shock absorber.

4. The vehicle according to claim 1, wherein:
the hood and the cowl top each have the support portion;
the support portion of the hood faces a front side surface of the beam portion of the shock absorber; and
the support portion of the cowl top faces a rear side surface of the beam portion of the shock absorber.

5. The vehicle according to claim 4, wherein a clearance between the support portion of the hood and the front side surface of the beam portion of the shock absorber is larger than a clearance between the support portion of the cowl top and the rear side surface of the beam portion of the shock absorber.

6. The vehicle according to claim 1, further comprising a protrusion disposed rearward of the shock absorber.

7. The vehicle according to claim 1, further comprising a guide portion extending downward from a rear edge of the beam portion and providing a clearance between the guide portion and the body structure.

8. The vehicle according to claim 7, wherein:
the cowl top has the support portion; and
the support portion faces a rear side surface of the guide portion and the beam portion of the shock absorber.

\* \* \* \* \*